US006637234B2

(12) United States Patent
Rossetto

(10) Patent No.: US 6,637,234 B2
(45) Date of Patent: Oct. 28, 2003

(54) METHOD OF AIR CONDITIONING INTERIORS AND AIR CONDITIONING UNIT FOR SAID METHOD

(76) Inventor: Federico Rossetto, Via Battaglione Monte Berico, 34-36100 Vicenza (IT)

(*) Notice: Subject to any disclaimer, the term of this patent is extended or adjusted under 35 U.S.C. 154(b) by 0 days.

(21) Appl. No.: 10/046,721

(22) Filed: Jan. 17, 2002

(65) Prior Publication Data

US 2002/0095945 A1 Jul. 25, 2002

(30) Foreign Application Priority Data

Jan. 25, 2001 (IT) .................................. VI2001A000021

(51) Int. Cl.[7] .......................... F25D 17/00; F25D 17/06
(52) U.S. Cl. .............................. 62/428; 62/426; 62/427; 62/333; 62/95
(58) Field of Search ........................... 62/507, 428, 95, 62/411, 412, 96, 277, 426, 427, 506, 498

(56) References Cited

U.S. PATENT DOCUMENTS

| 4,474,021 A | * | 10/1984 | Harband | 62/94 |
| 4,887,438 A | * | 12/1989 | Meckler | 62/94 |
| 5,325,676 A | * | 7/1994 | Meckler | 62/94 |
| 6,318,106 B1 | * | 11/2001 | Maeda | 62/271 |

FOREIGN PATENT DOCUMENTS

| DE | 297 04 633 U1 | 6/1997 |
| DE | 198 36 891 C1 | 5/2000 |
| EP | 0 785 399 A2 | 7/1997 |
| FR | 2523703 | 9/1983 |
| FR | 2556080 | 6/1985 |

\* cited by examiner

*Primary Examiner*—Chen Wen Jiang
(74) *Attorney, Agent, or Firm*—Dykema Gossett PLLC

(57) ABSTRACT

An air conditioning unit (1) for interiors is disclosed, carrying out a method comprising the following steps: carrying out a first thermal exchange between a first quantity of air drawn from an interior to be conditioned (A) and a second quantity of air drawn from the external ambient (E) in a first heat exchanger (7); after the first thermal exchange conveying the second quantity of air to a thermal exchange bank (12) connected to a thermal recovery bank (10) both belonging to a refrigerating circuit to carry out a second thermal exchange; after the second thermal exchange conveying the second quantity of air to the interior to be conditioned (A); after the first thermal exchange effecting a further thermal exchange between the first quantity of air and the recovery bank (10) before discharging the first quantity of air to the external ambient (E).

8 Claims, 4 Drawing Sheets

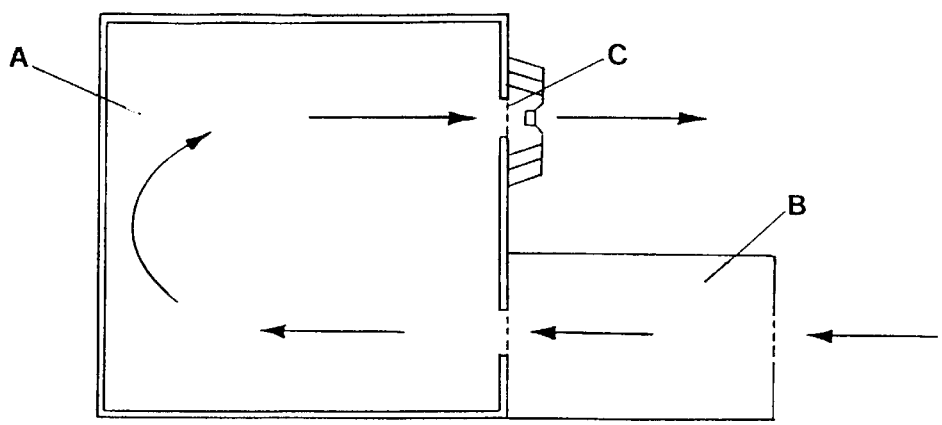
PRIOR ART FIG.1
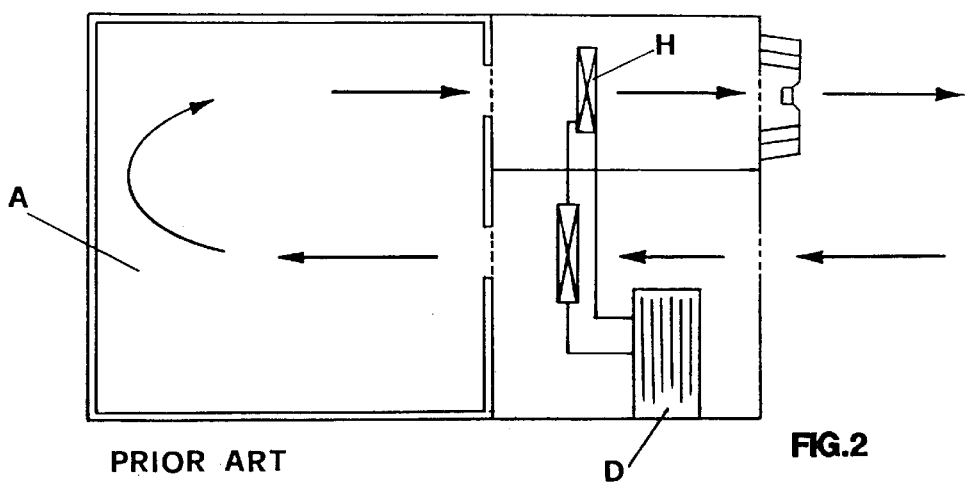
PRIOR ART FIG.2
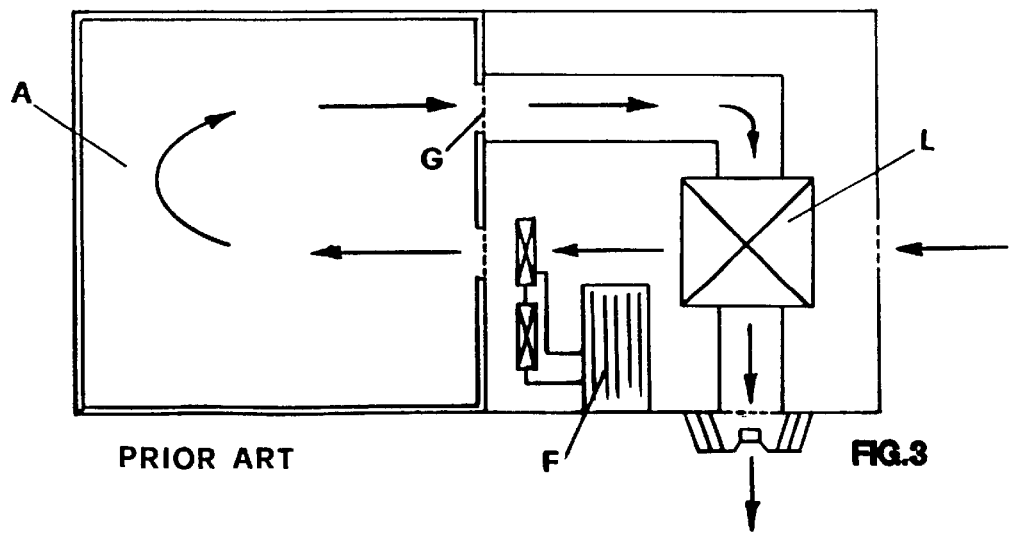
PRIOR ART FIG.3

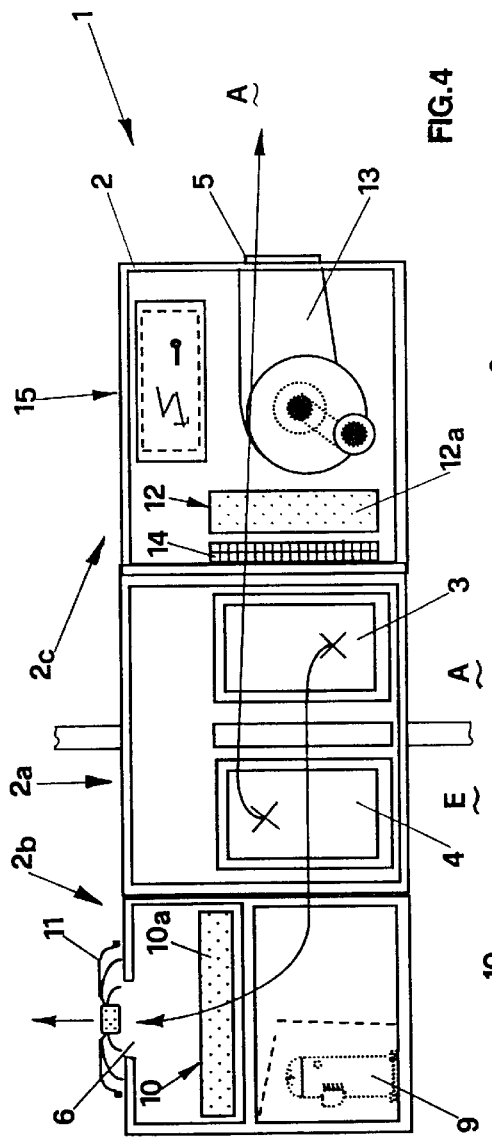
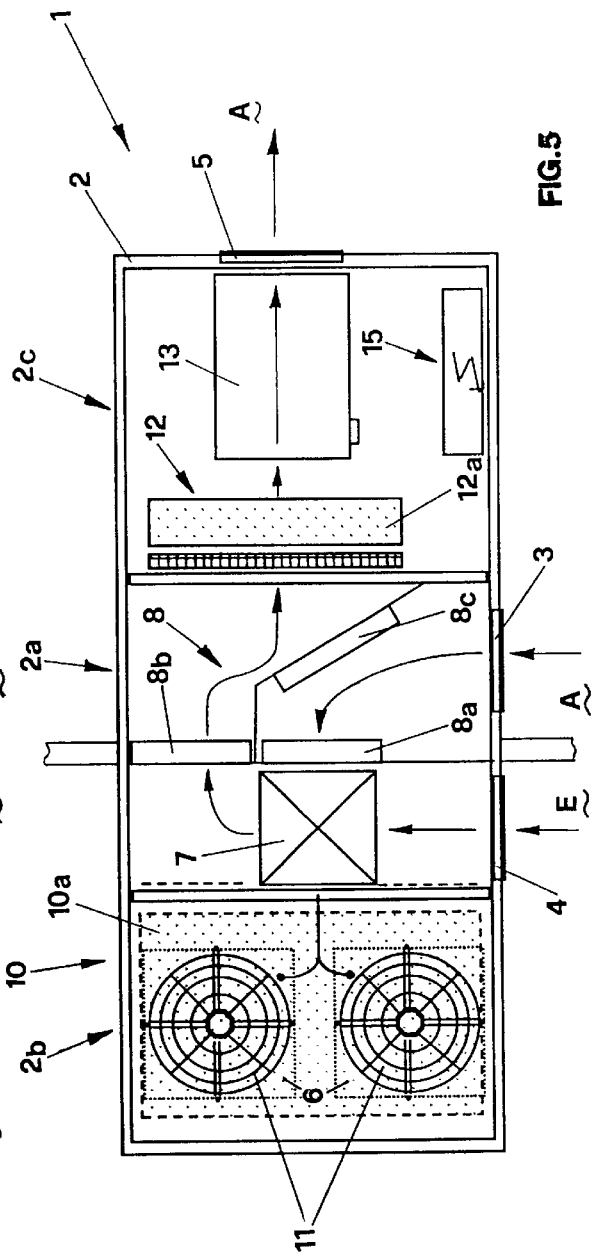

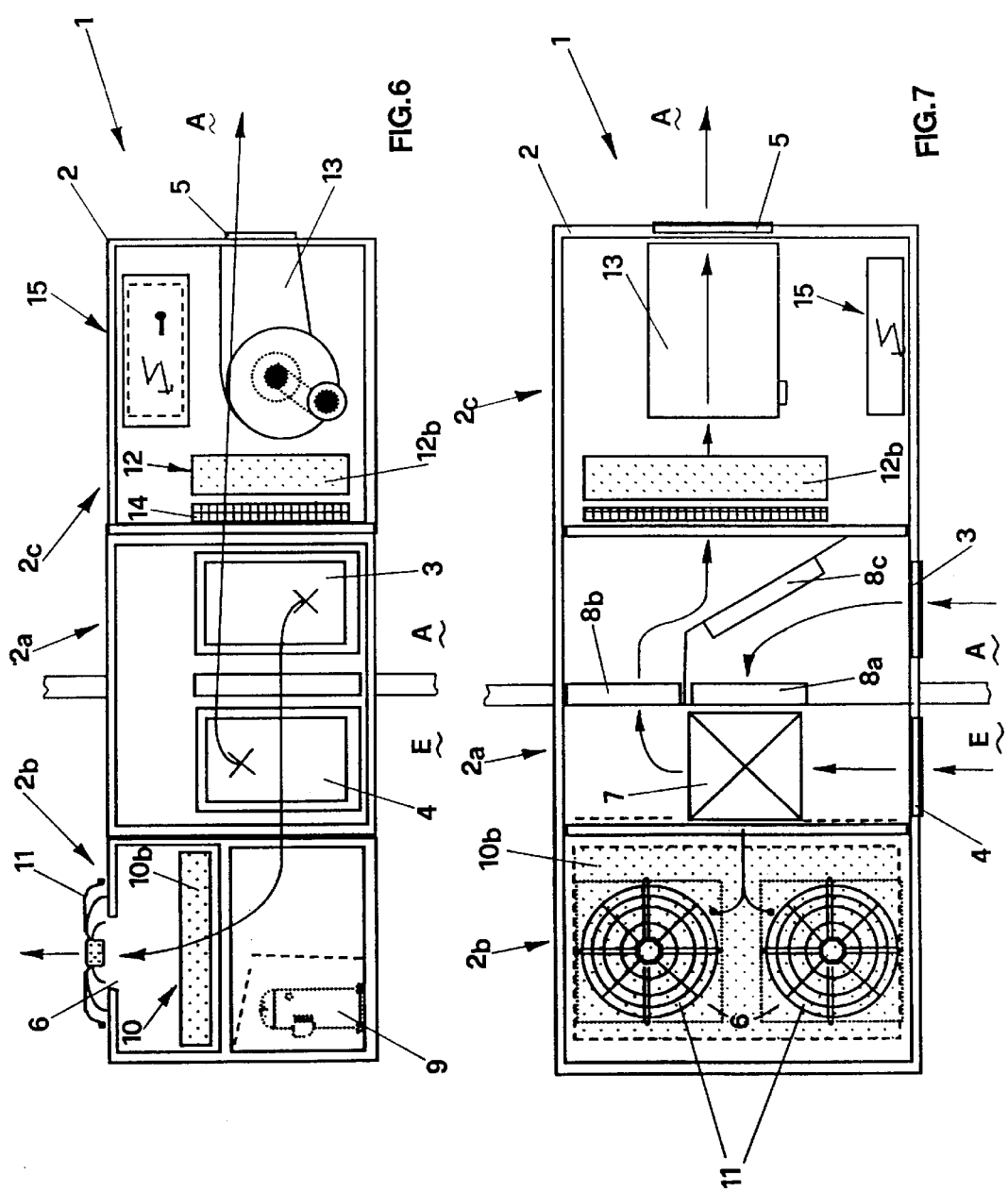

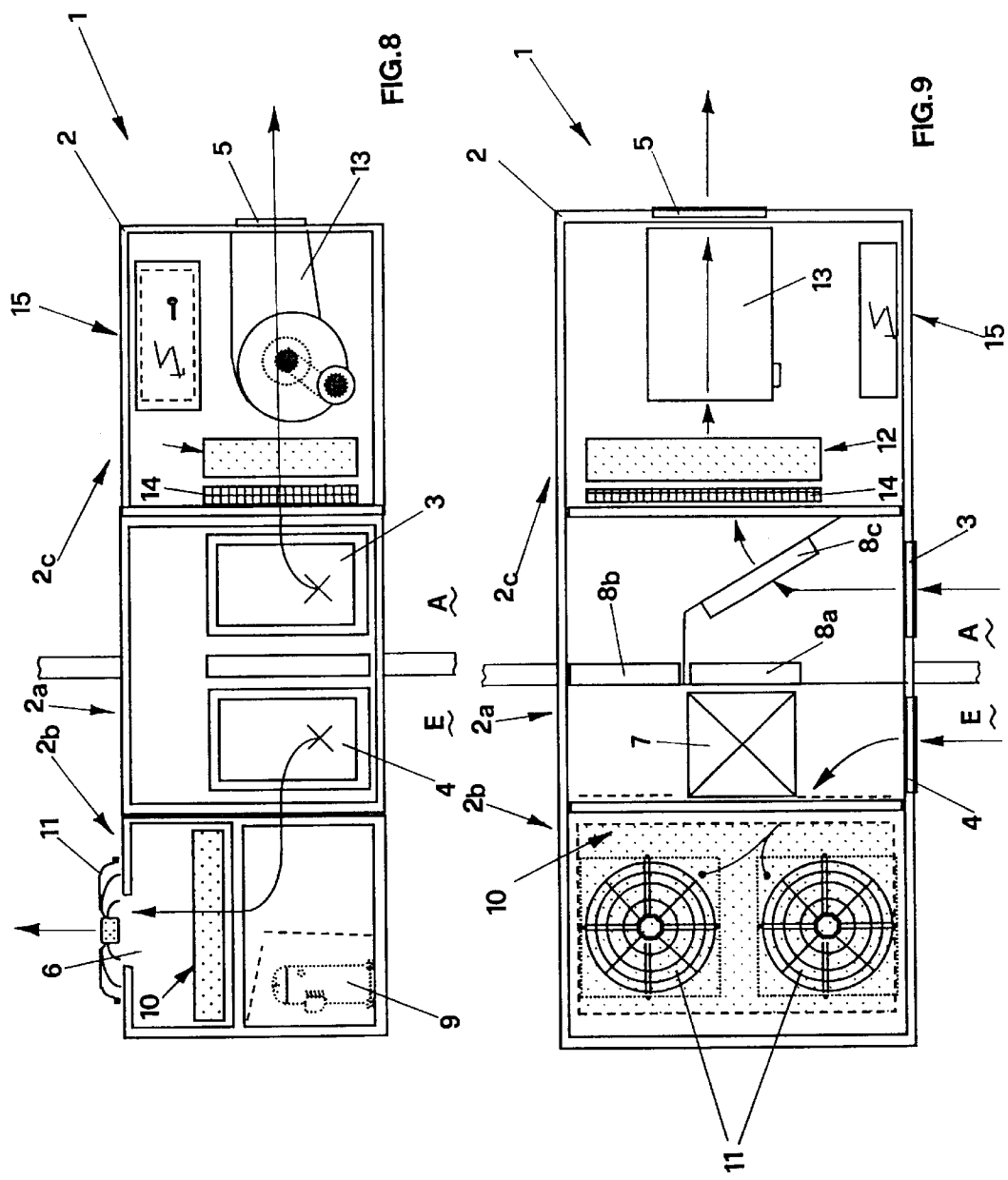

METHOD OF AIR CONDITIONING INTERIORS AND AIR CONDITIONING UNIT FOR SAID METHOD

RELATED APPLICATIONS

This application claims benefit of priority of Italian Patent Application Serial No. VI2001A000021, filed Jan. 25, 2001.

BACKGROUND OF INVENTION a. Field of Invention

The present invention relates to a method of air conditioning interiors and an air conditioning unit using said method, particularly adapted to be used for air conditioning interiors with high crowding index.

b. Description of Related Art

It is known that in closed and crowded interiors, quality of air tends to be degraded with time because of the pollutants generated by persons, more particularly carbon dioxide and tobacco smoke.

For this purpose law regulations and environmental rules impose that quality of air of the conditioned interior be kept within predetermined limits.

A good quality of air in a conditioned interior is obtained with continuous change of air through expulsion of foul air and restoration with an equal quantity of external fresh air.

Change of air should be more or less frequent according to the cubic volume of the interior to be conditioned, the amount of introduced polluting substances and the crowding index of the interior which is known to be defined by the number of persons per unit of surface.

In this way a minimum quantity of cubic meters of change air per hour and per person present in the interior is warranted according to the requirements of the regulations.

The change air taken from the external ambient, before being introduced into the interior to be conditioned, generally undergoes a further treatment consisting of cooling, dehumidification or heating according to the season or the wanted operative mode of the conditioner.

A first known system, diagrammatically shown in FIG. 1, provides for cooling or heating of interior A occurring by using a heat pump B or equivalent conditioning equipment. This system has however the drawback that the energy contents of foul air ejected through the outlet C is not recovered in any way.

Another known system diagrammatically shown in FIG. 2, provides for use of a heat pump D in which foul air ejected from interior A, passes through the thermal recovery bank H of the heat pump D so as to improve efficiency of the equipment.

As an alternative to said known systems, use of cooling and heating equipments is provided, one of them being diagrammatically shown in FIG. 3, in which change air is treated in a heat pump equipment F either in the cooling mode or heating mode, after thermal recovery of the energy contents of air ejected from interior A through outlet G, by a counter current thermal exchange, for instance in an air-air plate exchanger L.

In this case an improvement of the equipment efficiency is obtained, that however is not yet optimal because ejected air still has a fair contents of energy.

The present invention aims at improving efficiency of said equipments.

SUMMARY OF INVENTION

More particularly an object of the invention is to provide a method of air conditioning interiors and a machine for carrying out the method, adapted to obtain better efficiency in comparison with equivalent methods and equipments of the prior art.

Another object of method and machine of the invention is to obtain said improvement of efficiency still keeping in the interior the same quality of air obtained with equivalent equipments of the prior art.

A last but not least object is to provide a fail safe air conditioning unit without higher manufacturing costs in comparison with the equipments of the prior art.

These and other objects that will be better indicated in the following description, are attained by a method of air conditioning interiors that according to the wording of the main claim, comprises the following steps:

drawing a first quantity of air from an interior to be conditioned;

drawing a second quantity of air from the external ambient;

effecting a first thermal exchange between said quantities of air in at least a first heat exchanger;

after said first thermal exchange conveying said second quantity of air to at least a thermal exchange bank connected to at least one thermal recovery bank, both belonging to a refrigerating circuit for obtaining a second thermal exchange;

after said second thermal exchange conveying said second quantity of air to said interior to be conditioned;

after said first thermal exchange conveying said first quantity of air to said external ambient, wherein after said first thermal exchange and before being conveyed to said external ambient, said first quantity of air undergoes a further thermal exchange with said at least one recovery bank.

A preferred embodiment of an air conditioning unit carrying out the method of the invention consists of a structure comprising:

at least a first inlet of said first quantity of air from the interior to be conditioned;

at least a second inlet for said second quantity of air from the external ambient;

at least a first heat exchanger effecting said first thermal exchange between said first quantity of air and said second quantity of air;

at least an outlet for said second quantity of air to the interior to be conditioned;

at least a discharge opening of said first quantity of air to the external ambient;

suction means for drawing and conveying said quantities of air to said first heat exchanger;

at least a refrigerating circuit including at least a thermal exchange bank downstream said first heat exchanger, said second quantity of air to be introduced into said interior to be conditioned passing through said bank, and at least a thermal recovery bank, wherein said at least one thermal recovery bank is arranged downstream said first heat exchanger at said discharge opening, so that said first quantity of air passes through said recovery bank before being discharged to said external ambient.

In this way a substantial improvement of the thermodynamical efficiency of the air conditioning unit is advantageously obtained in comparison with the prior art equipments of equivalent capacity.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

Further characteristics and features of the invention will be better understood from the following description making reference to the accompanying sheets of drawings in which:

FIGS. 1 to 3 are diagrammatic views of the above mentioned prior art systems;

FIGS. 4 and 5 are two different schematic views of the air conditioning unit of the invention in the winter operative mode;

FIGS. 6 and 7 show the air conditioning unit of the invention in the summer operative mode; and FIGS. 8 and 9 show the air conditioning unit of the invention in the full recirculation operative mode.

DETAILED DESCRIPTION OF THE PREFERRED EMBODIMENTS

The method of the invention is described by making reference to the air conditioning equipment to carry out the method, that is generally indicated with reference numeral 1 in FIGS. 4 to 9 in different operative conditions.

Preferably said equipment is used for air conditioning interiors A with high crowding index where frequent change of air is required.

In the FIGS. of the drawings the air flow paths are indicated by arrows.

When the flows are incoming or outgoing relative to the drawing sheet plane, the arrows are conventionally indicated with X for incoming flows or a point (●) when outgoing.

The air conditioning unit 1 of the invention comprises a structure 2 of a general box like shape adapted to contain the components of said air conditioning unit, in which outer openings for exchange of air flows between the external ambient E and the interior A to be conditioned are located.

More particularly one can see:

a first inlet 3 communicating with the interior to be conditioned A;

a second inlet 4 communicating with the external ambient E;

an outlet 5 for the treated air to the interior to be conditioned A;

a discharge opening 6 of foul air from air conditioned interior A.

Inside structure 2 there is a central zone 2a where a first heat exchanger 7 of the air-air type such as a plate exchanger is arranged, which is in communication with the adjacent zones through air locks generally indicated with numeral 8.

Said adjacent zones particularly comprise:

a first zone 2b in which there is a compressor 9 belonging to a thermal recovery bank 10 connected thereto, both forming the refrigerating circuit of a heat pump;

a second zone 2c in which there is a thermal exchange bank 12 of the same heat pump and a delivery fan 13, both positioned upstream the air outlet 5 to the interior to be conditioned A.

Obviously the three zones 2a, 2b, 2c communicate with each other through openings for the passage of air flows.

The recovery bank 10 is arranged upstream the discharge opening 6 ejecting air to the external ambient E, and is provided with drawing fans 11, preferably but not necessarily arranged outside the structure 2.

Near the exchange bank 12 a flat air purification filter 14 is also arranged.

Connection and valve means are also provided but not shown in the drawings for easiness of illustration, belonging to the reversible refrigerating circuit, for instance a heat pump substantially consisting of the compressor 9, the exchange bank 12 and the recovery bank 10.

It is also to be noted that in the structure 2 an electric board generally indicated with 15 is provided, containing the electrical and electronic control devices.

In the winter operative mode shown in FIGS. 4 and 5, the air conditioning unit is used as a heater for the interior A.

Foul air present in the interior to be conditioned A, is sucked by the suction fans 11 through the first inlet 3 and passes to the heat exchanger 7 through the open air lock 8a.

In a similar way and at the same time the delivery fan 13 puts into depression the zones 2c and 2a so that fresh air is drawn from the external ambient E through the second inlet 4 and is also being passed through the first heat exchanger 7.

Air coming from the air conditioned interior A has an enthalpy higher than air coming from outside that in winter normally is at a lower temperature than air ejected from the conditioned interior.

At the first heat exchanger 7, a portion of the thermal energy of air coming from the conditioned interior is given to the colder air coming from the external ambient E so as to obtain a first recovery of thermal energy.

After this first thermal recovery, air coming from the external ambient E going out from the first exchanger 7, passes through air lock 8b and hits the thermal exchange bank 12 that in this case acts as condenser 12a from which said air absorbs additional thermal energy.

The delivery fan 13 then conveys the heated air to the air conditioned interior A through the outlet 5.

The quantity of heat absorbed by air coming from the external ambient E during said exchanges, is such as to allow to reach the temperature wanted inside the interior to be conditioned A.

Air drawn from the conditioned interior A that gave a portion of its thermal energy to air coming from the external ambient E, still has a portion of thermal energy that is recovered by its conveyance to the recovery bank 10 that in this case acts as evaporator 10a.

This exchange with evaporator 10a allows to increase the efficiency of the heat pump thus obtaining the above mentioned advantages. Foul air is finally ejected to the outside E through the discharge opening 6.

In case of the summer operative mode shown in FIGS. 6 and 7, the air conditioning unit is used as refrigerator for interior A.

Foul air present in the interior to be conditioned A, is sucked by the suction fans 11 through the first inlet 3 and passes to the heat exchanger 7 through the open air lock 8a.

In a similar way and at the same time the delivery fan 13 puts in depression zones 2c and 2a so that fresh air is drawn from the external ambient E through the second inlet 4 and also passes through the first heat exchanger 7.

Air coming from the conditioned interior A has a lower enthalpy than air coming from outside that in summer is normally at a higher temperature than air ejected from the conditioned interior.

At the first heat exchanger 7 a portion of the residual refrigerating power still contained in air coming from the conditioned interior, is given to warmer air coming from the external ambient E, so as to carry out a first recovery of refrigerating energy.

After this first refrigerating recovery, air coming from the external ambient E going out from the first exchanger 7, passes through air lock 8b and hits the thermal exchange bank 12 that in this case acts as evaporator 12b, from which the air absorbs additional refrigerating energy.

The delivery fan 13 then conveys refrigerated air to the conditioned interior A through the outlet 5.

The quantity of refrigerating energy absorbed by air coming from the external ambient E during these exchanges, is such as to allow to reach the wanted temperature inside the interior to be conditioned A.

Air drawn from the conditioned interior A that gave a portion of its refrigerating energy to air coming from the external ambient E, still has a portion of refrigerating energy that is recovered through its conveyance to the recovery bank 10 that in this case acts as condenser 10b.

This exchange with condenser 10b allows to increase efficiency of the heat pump so as to obtain the above mentioned advantages. Foul air is finally ejected to the outside E through the discharge opening 6.

In both winter and summer operative modes, as shown in FIGS. 4 to 7, the flow rates of air drawn from the external ambient E and the conditioned interior A respectively, being not mixed with each other, must be identical so as to avoid conditions of pressure or depression of said conditioned interior A.

This check is carried out by the electric and electronic devices of the electric board 15 that are properly regulating rotational speed of the drawing fan 12 and delivery fan 13 respectively.

In FIGS. 8 and 9 the air conditioning unit 1 of the invention is shown in the full recirculation operative mode.

By closing the air locks 8a and 8b and opening air lock 8c, quantity of air drawn from the interior to be conditioned A and quantity of air drawn from the external ambient E undergo a change of their flow directions, and the first heat exchanger 7 does not receive any air flow.

More particularly air coming from the conditioned interior A is sucked by the delivery fan 13 through the first inlet 3 and through the open air lock 8c passes directly through the thermal exchange bank 12 for being introduced to the interior to be conditioned A through outlet 5.

The heat exchange bank 12 consists of a condenser-evaporator 12a, 12b for the full winter-summer recirculation operation of the air conditioning unit 1. Air coming from the external ambient E is sucked by the suction fans 11 through the second inlet 4 and passes through the recovery bank 10 to be ejected to the external ambient E through the discharge opening 6.

The thermal recovery bank 10 consists of an evaporator-condenser 10a, 10b for the full winter-summer recirculation operation of the air conditioning unit.

In this case the function of the electronic control will be different from the previously described modes because the suction fan 11 and the delivery fan 13 are operating in an independent way.

The full recirculation operation occurs under particular conditions, for instance in winter when the heating unit is switched on and there is the need to bring the interior to the required temperature before using the conditioner with air change as previously described and shown in FIGS. 4 and 5.

When the equipment operates under these conditions, the thermal recovery bank 10 consisting of the evaporator 10a, under particular temperature conditions for instance in harsh winter, may freeze.

In order to carry out defrosting, the equipment is operated according to the winter operation cycle shown in FIGS. 4 and 5 for the time needed for the defrosting operation.

Another situation of full recirculation operation occurs in summer when the temperature of the interior must be lowered before using the air conditioning unit with air change as previously described and shown in FIGS. 6 and 7.

From the foregoing it is therefore clear that the described method and the air conditioning unit carrying out the method attain all the intended objects.

Constructional modifications may be made in the implementation stage to the method and the air conditioning unit.

More particularly a greater number of suction openings may be provided, that may be arranged in any position on the structure and provided with suitable purification filters.

Consequently also the components of the air conditioning unit may be arranged in a different way when air flows are properly conveyed, for instance by means of ducts with different shape.

Even the position and number of the drawing fans may be different from the relevant air flows.

Also the refrigerating circuit may have different configurations, so that for instance more refrigerating circuits either reversible or irreversible may be combined together.

In any case it is to be understood that other implementing modifications neither cited, nor described or illustrated, are to be considered as covered by the present patent when falling within the scope of the appended claims.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method of air conditioning interiors comprising the following steps:
   drawing a first quantity of air from an interior to be conditioned;
   drawing a second quantity of air from the external ambient;
   carrying out a first air/air thermal exchange between said quantities of air in at least one first heat exchanger;
   after said first air/air thermal exchange, conveying said second quantity of air to at least one thermal exchange bank connected to at least a one thermal recovery bank, both belonging to a refrigerating circuit for carrying out a second thermal exchange;
   after said second thermal exchange conveying said second quantity of air to said interior to be conditioned;
   after said first air/air thermal exchange conveying said first quantity of air to said external ambient,
   wherein after said first air/air thermal exchange and before being conveyed to said external ambient, said first quantity of air undergoes a further thermal exchange with said at least one recovery bank.

2. The method according to claim 1, wherein said second quantity of air absorbs heat from said thermal exchange bank when said first quantity of air gives heat to said recovery bank.

3. The method according to claim 1, wherein said second quantity of air gives heat to said thermal exchange bank when said first quantity of air absorbs heat from said recovery bank.

4. The method according to claim 1, wherein said first quantity of air and said second quantity of air are equal to each other.

5. An air conditioning unit for carrying out the method according to claim 1, including a structure which comprises:
- at least one first inlet for said first quantity of air from the interior to be conditioned;
- at least one second inlet for said second quantity of air coming from the external ambient;
- at least one first heat exchanger carrying out said first air/air thermal exchange between said first quantity of air and said second quantity of air;
- at least one outlet for said second quantity of air to the interior to be conditioned;
- at least one discharge opening for said first quantity of air to the external ambient (E);
- suction means for drawing and conveying said quantities of air to said first heat exchanger;
- at least one refrigerating circuit comprising at least one thermal exchange bank downstream said first heat exchanger and adapted to be crossed by said second quantity of air to be introduced to said interior to be conditioned and at least one thermal recovery bank wherein said at least one thermal recovery bank is arranged downstream said first heat exchanger at said discharge opening for being crossed by said first quantity of air before its discharge to the external ambient.

6. The air conditioning unit according to claim 5, wherein said refrigerating circuit is reversible.

7. The air conditioning unit according to claim 5, wherein said thermal recovery bank consists of an evaporator and said thermal exchange bank consists of a condenser when the air conditioning unit is to be used as heater.

8. The air conditioning unit according to claim 5, wherein said recovery bank consists of a condenser and said thermal exchange bank consists of an evaporator when the air conditioning unit is to be used as refrigerator.

* * * * *